United States Patent [19]
Alimena et al.

[11] Patent Number: 5,559,515
[45] Date of Patent: Sep. 24, 1996

[54] CHANNEL SWITCHING INTERFEROMETRIC AMTI RADAR

[75] Inventors: James J. Alimena, Fairfield, Conn.; Richard J. Briones, Fort Salonga, N.Y.

[73] Assignee: Northrop Grumman Norden Systems, Norwalk, Conn.

[21] Appl. No.: 325,521

[22] Filed: Nov. 27, 1981

[51] Int. Cl.$^6$ .................................................... G01S 13/08
[52] U.S. Cl. ............................ 342/118; 342/104; 342/147
[58] Field of Search ................................ 343/5 CM, 5 FT, 343/7.7, 768; 342/118, 104, 147

[56] References Cited

U.S. PATENT DOCUMENTS

| 4,086,590 | 4/1978 | Goggins, Jr. | 343/5 CM |
| 4,217,583 | 8/1980 | Hiller et al. | 343/7.7 |
| 4,348,679 | 9/1982 | Shnitkin et al. | 343/768 |

*Primary Examiner*—Theodore M. Blum

[57] ABSTRACT

An AMTI radar system utilizes a three-aperture interferometric antenna having substantially identical beamwidths on each of the three receiving channels. A switching network connected to first the left and center aperture and then the center and right aperture alternates during each pulse repetition interval to couple the radar returns from the three receive apertures to two processing channels. Conventional motion compensation is performed on the data sets of radar returns in each of the two channels. The data sets in each channel are then delayed by one pulse repetition interval and combined with corresponding undelayed data sets. During alternate pulse repetition interval in each channel, valid data sets are gated to an array storage. Fast Fourier transforms are then taken to transform the data sets in each channel into the frequency domain, so that separate range doppler maps of the radar returns can be formed in an array storage unit. In other words, one doppler map is from the left and center apertures while the other range doppler map is from the center and right apertures. A detection and validation processing is performed to provide accurate moving target information in range, doppler, angle and amplitude.

4 Claims, 3 Drawing Sheets

CHANNEL SWITCHING INTERFEROMETRIC AMTI RADAR

CHANNEL SWITCHING INTERFEROMETRIC AMTI RADAR

LICENSE RIGHTS

The Government has rights in this invention pursuant to Contract No. F30602-78-C-0261, awarded by the Department of the Air Force.

CROSS REFERENCE TO RELATED APPLICATIONS

The subject matter of this patent application is related to that disclosed in U.S. patent application Ser. No. 325,522 filed Nov. 27, 1981 by J. DiDomizio and R. A. Guarino for DUAL CANCELLATION INTERFEROMETRIC AMTI RADAR and to U.S. patent application Ser. No. 325,523 filed Nov. 27, 1981 by J. DiDomizio for MAXIMIZED/ MINIMIZED PHASE CALCULATOR FOR AN INTERFEROMETRIC AMTI RADAR, both of which are assigned to the same assignee as the present case.

TECHNICAL FIELD

This invention relates to an aircraft-mounted synthetic aperture radar system and, more particularly, to an AMTI radar system that utilizes a displaced phase center signal processing technique and an interferometric processing technique to enhance target identification in the radar returns.

BACKGROUND ART

An airborne moving target indicator (AMTI) radar is generally known and is the type of radar that has the capability to reject or cancel signals from fixed, or unwanted targets (non-movers), such as buildings, hills, etc. At the same time, such radars typically highlight or enhance the radar return signals from any moving targets (movers) such as aircraft, vehicles, or the like. One technique used in AMTI radar of the coherent type involves utilizing the doppler shift imparted to the reflected radar signals by a moving target as a part of a processing scheme to distinguish a mover from a non-mover, This doppler shift appears as a change in the phase of the received signals between consecutive illuminating radar pulses.

There are a number of problems which must be considered in the processing of radar returns where the AMTI radar is mounted in an aircraft. Because the aircraft is moving with respect to both the fixed and moving targets, the radar returns from both target and clutter experience a frequency shift which can be corrected by known motion compensation techniques.

Synthetic-aperture radars are also generally known and such system generally use a multi-aperture antenna and movement of the platform on which the antenna is mounted as additional input into the processing of return signals in an AMTI radar. While this adds significantly to the complexity of the processing of the radar return signals, the resultant clutter cancellation can significantly enhance the identification of moving targets.

One well-known method of compensating for the effects of aircraft motion is known as displaced phase center technique and involves electronically displacing the antenna's phase center along the flight path of the aircraft. Briefly, the technique involves the transmission and reception of radar returns by the antenna of the radar system having its phase center at a first known location. A second illuminating pulse is then transmitted and the return stored while the antenna has its phase center at a second known location. The phase centers of the first and second returns are separated by a precisely known distance related to the movement of the aircraft during the interpulse period and, knowing this information, the phase centers can electrically be changed to essentially coincide in time. At that point, the signals received by the multiaperture antenna from clutter, or stationary objects, will have properties suitable to cancellation leaving only the movers to be detected.

One technique for clutter cancellation is described in U.S. Pat. No. 4,093,950 issued Jun. 6, 1978 to T. ap Rhys for MOTION-COMPENSATION ARRANGEMENTS FOR MTI RADARS. The clutter suppression technique described in this patent is not limited to two pulses at a time but may be applied to a number of pulses. Phase and amplitude adjustments are also made to minimize the effects of antenna construction errors. The antenna subarrays have phase centers which are separated by 2VT. The sum and difference signals from each to adjacent subarray are taken to produce a sum channel and a difference channel for each group of subarrays. After adjustment of the difference channel signal in phase and amplitude, the latest return is added to a delayed return to produce a correction signal. That correction signal is then added to a delayed signal in the corresponding sum channel to provide a signal that is synchronized in time and phase with the most recent signal in the sum channel.

Also of interest is an article entitled "Air-to-Ground MTI Radar Using a Displaced Phase Center, Phased Array" by M. L. Stone and W. J. Ince published June 1980 in the IEEE International Radar Conference Proceedings. The article describes an AMTI radar utilizing an electronically scanned displaced phase center antenna, an advanced digital signal processor and real time, automated target acquisition and display. In this approach, the first pulse of a pair of transmissions is radiated from the leading phase center and the received radar signal is stored in a buffer. The second pulse is radiated a short time later from the rear phase center when the boresite-axis is precisely aligned with the boresite direction of the first transmission. The second received signal is also subtracted from the first received signal in an MTI canceller circuit. The pulse pair separation is equal to D/V, where D is the phase center displacement and V is the aircraft velocity, the clutter is eliminated by the canceller circuit, enabling slow moving targets to be detected. It should be noted that the antenna phase center is translated along the direction of the array axis by a single wavelength to compensate for the forward motion of the aircraft. This is accomplished by a radiating element switching circuit which alternates on a pulse-by-pulse basis.

DISCLOSURE OF INVENTION

It is an object of the present invention to provide an airborne moving target indicator radar system which utilizes channel switching from a three-aperture interferometric antenna to two receiver processing channels to detect moving targets against a clutter background and to measure angles to those targets.

A particular feature of the present invention involves the use of a three-aperture interferometric antenna which have substantially identical beam-widths on each of the three receive channels. The radiating aperture utilizes the entire antenna and thus this aperture has a more narrow radiating pattern. A switching network connected to each of the three apertures alternates on a pulse-by-pulse basis to connect first the left aperture and center aperture to the two receive channels for a first interpulse period, and then during the second inter-pulse period connects the center aperture and the right aperture to the two receive channels. Conventional motion compensation is then performed on the radar returns received in each of the two channels. The data in each channel is then delayed by one PRI and combined with the undelayed data. An alternate PRI gate in each channel passes the valid data to an array storage. Next, Fast Fourier transforms are performed on the data in each channel. Two range-doppler maps are then formed in an array storage unit, one being from the left and center apertures while the other range doppler map is from the center and right apertures. A detection and validation process is performed to provide accurate moving target information in range, doppler, angle and amplitude.

A feature of the channel switching, interferometric AMTI radar according to the present invention is that it employs a detection and validation processing technique that enhances moving target identification by use of an azimuth angle versus doppler frequency discriminant function.

Another feature of the channel switching, interferometric AMTI radar according to the present invention is that it utilizes direct angle measurement. This is accomplished by generating separate range doppler maps from both a left center aperture and also from a center right aperture from data gathered at the same time. Angle calculation is performed directly from the data in the two-range doppler maps by an interferometric processing technique without adding any calculated phase correction to the data which may inherently contaminate the angle measurement process.

The foregoing and other objects, features and advantages of the present invention will become more apparent from the following description of preferred embodiments and accompanying drawings.

BEST MODE FOR CARRYING OUT THE INVENTION

Figure 1:
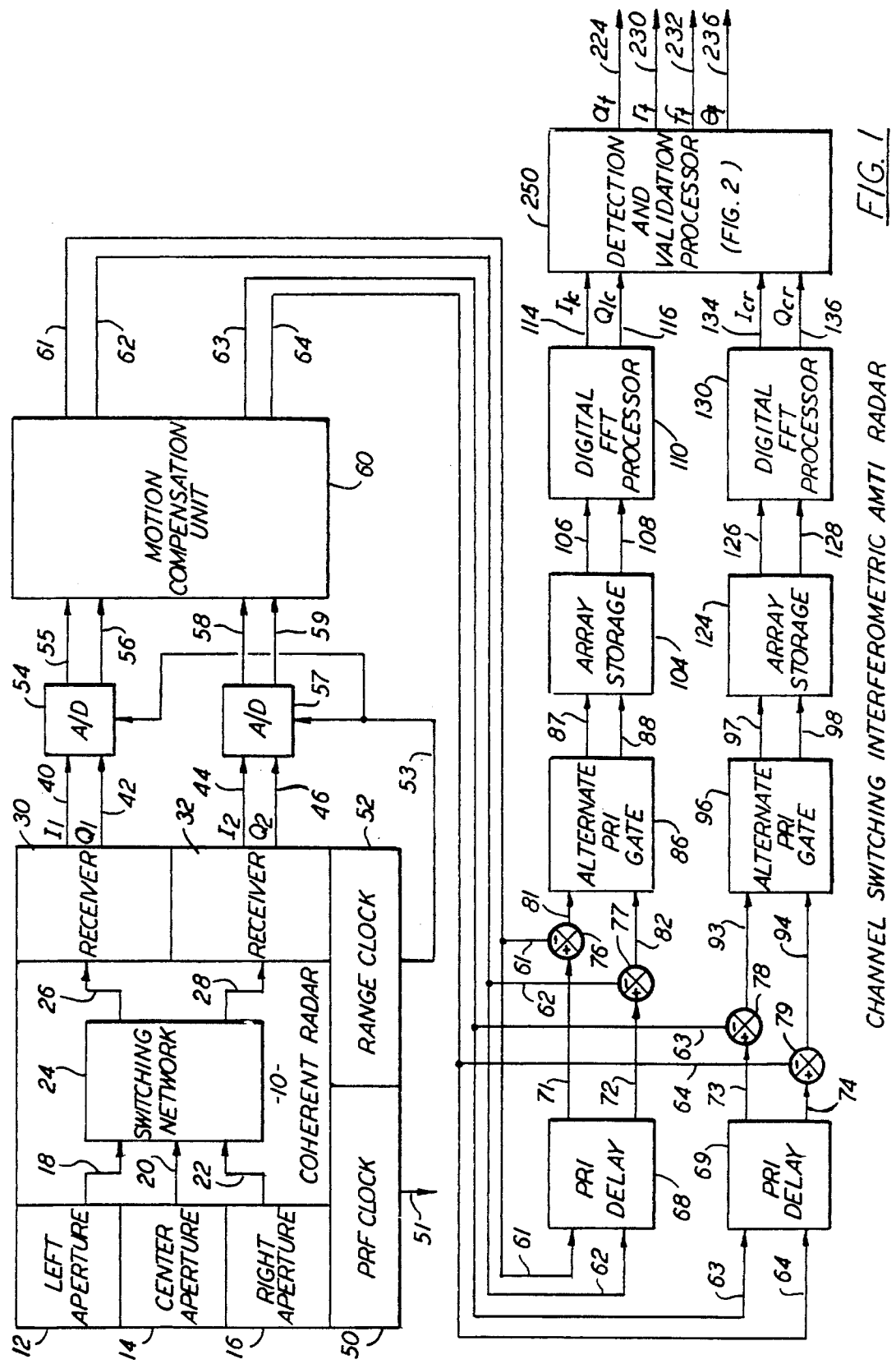
FIG. 1 is a drawing in block diagram form that depicts one embodiment of a channel switching, interferometric AMTI radar according to the present invention.
Figure 2:
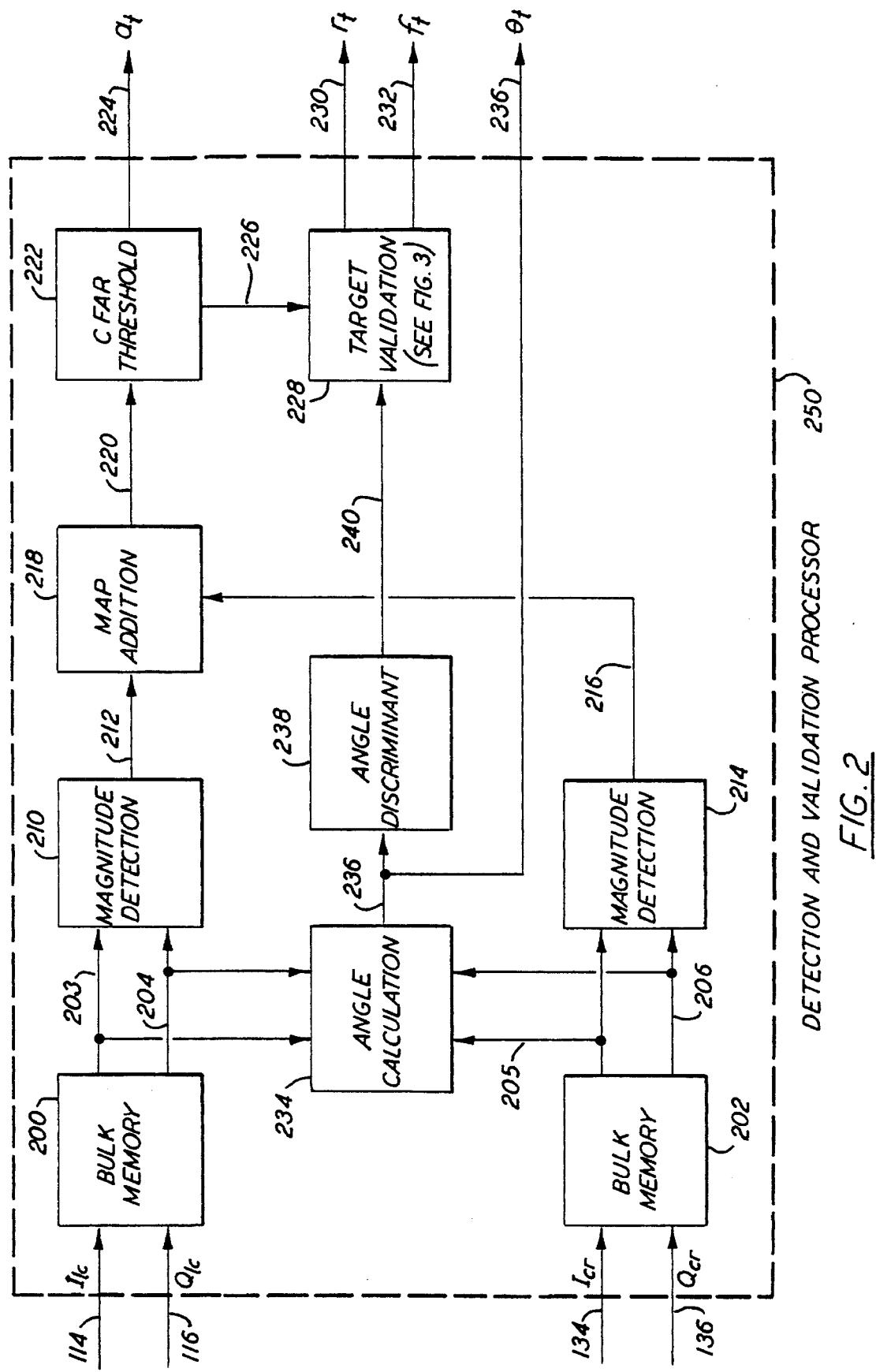
FIG. 2 is a drawing in block diagram form depicting the detection and validation processor shown in FIG. 1.

Referring initially to FIG. 1, there is seen one embodiment of a displaced phase center interferometric radar according to the present invention. The angle measurement technique described herein provides a means of accurately measuring the angle to moving targets which are in a main beam clutter background by combining an angle sensor (interferometer) with a displaced phase center (DPC) antenna. The present invention is utilized in processing signals acquired by a radar 10 of the coherent type which is known in the art. The radar system utilizes a multiaperture antenna of the type which is known in the prior art. Such antennas might include a phased array antenna or reflector antenna, or combinations thereof. In any event, the radar antenna system would be configured to provide a left aperture 12, a center aperture 14 and right aperture 16 for the reception of radar returns. The entire antenna is used for illumination.

A particular feature of the present invention is that the antenna beamwidths of the left, center and right apertures are substantially identical and are broader than the illuminating aperture beamwidth (the illuminating aperture beam is more narrow by a factor of 1–3). As a consequence of this difference, the clutter doppler spectra received by each aperture is defined primarily by the transmit pattern providing for a high degree of clutter cancellation. Each aperture is connected by a length of transmission line to a switching network 24, i.e., the left aperture 12 is connected by the transmission line 18, the center aperture 14 is connected by the transmission line 20 and the right aperture 16 is connected by the transmission line 22. At the output end of the switching network 24, a transmission line 26 leads to a receiver 30 and a transmission line 28 leads to a receiver 32. The switching network alternates on a pulse-by-pulse basis to connect first the left aperture 12 and the center aperture 14, and alternately the center aperture 14 and the right aperture 16, to the receiver 30 and the receiver 32, respectively. In other words, during odd pulse repetition intervals (PRIs) the radar return from the left aperture 12 is directly coupled to the receiver 30 and the return from the center aperture 14 is directly coupled to the, receiver 32. However, during even PRIs the return from the center aperture 14 is presented along the transmission lines 20 and 26 to the receiver 30 while the return from the right aperture 16 is presented along the transmission lines 22 and 28 to the receiver 32. As is known, each of the receivers 30 and 32 typically convert the radar signals received at RF frequency first to an IF frequency and then to video in which two different components are shifted in phase by 90°. In other words, the output from the receiver 30 has an in-phase component $I_1$ on the line 40 and a quadrature components $Q_1$ on the line 42 and the output from the receiver 32 has an in-phase component $I_2$ on the line 44 and a quadrature component $Q_2$ on the line 46.

The I and Q video signals from both receivers are provided to analog-to-digital (A/D) converters 54 and 57, respectively, so that the signals on the lines 55, 56 and the lines 58, 59 are digtal representations of the magnitudes of in-phase and quadrature components of each signal received by the radar apertures. The remainder of the disclosure is digital in nature and for simplicity the representations shown on FIG. 1 are for individual signal lines rather than trying lines to accommodate binary signals. It should be understood that all signals described hereinafter are the actual radar return signals or they are signals upon which modifications or changes have been performed in accordance with the described process. These signals are quantized with the requisite degree of fineness such that there is no significant errors which arise as a result of quantization noise. The coherent radar 10 includes a pulse repetition frequency (PRF) clock 50 to provide timing signals on the line 51 related to each transmission or illuminating pulse from the radar system. The PRF utilized in this configuration is selected so that the aircraft motion perpendicular to the antenna orientation motion from one pulse to the next is one-half the array spacing. This is called the matched PRF of the system. And, in addition, a range clock 52 provides a high frequency timing signal on the line 53.

The I and Q signals, in digital form, from the receivers 30 and 32 are fed into a motion compensation unit 60. An inertial navigation system (INS, not shown) or other similar systems on the radar platform provides digital signals indicating platform motion to the motion compensation unit. The received radar signals are complex multiplied by the INS signals to compensate for platform motion. A complex multiplier circuit is generally known in the art and the purpose of the complex multiplier is to rotate the incoming radar data in any given range bin during a given PRI by a signal that represents the platform motion with respect to the range bin of interest. This results in the compensation of the data for platform motion, thus correcting for the doppler frequency at the center of the radar beam. The outputs from the motion compensation unit 60 are the signals on lines 61, 62, 63 and 64 and these signals represent the in-phase I and quadrature Q components of the motion compensated signals received by the left aperture, the center aperture and the right aperture.

A particular feature of the present invention involves the use of the left/center multiplexed signals and the center/right multiplexed signals to derive subtracted pairs of signals which are fed into array storage. The signals on the lines 61 and 62 and the signals on the lines 63 and 64 are presented to a PRI delay unit 68 and 69, respectively, where the signals are delayed by one pulse repetition interval. The signals on the line 61 and 62 are also presented to summing nodes 76 and 77 while the signals on the lines 63 and 64 are presented to summing nodes 78 and 79. At the summing nodes 76 and 77 the left/center signals are subtracted from the delayed left/center signals to produce left minus center information on the lines 81 and 82 for every PRI. In the same fashion, the right/center signals are subtracted from the delayed right/center signals to produce center minus right information on the lines 93 and 94 for every pulse repetition interval. Because this information is only valid for every other pulse repetition interval a pair of alternate PRI gates 86 and 96 are provided. Each alternate PRI gate is enabled during every other PRI to pass only the valid left minus center and center minus right data to the array storage.

Two bulk memory devices are used for array storage, memory 104 and memory 124. Each memory device is of sufficient size to record $N_d$ PRIs of data for each of $N_r$ range bins. The memory 104 accepts data from the left/center aperture and the memory 124 accepts data from the center/right aperture.

A particular feature of the present invention is that Fast Fourier transforms of all stored data points are taken so that a digital FFT processor 110 is connected by the lines 106 and 108 to the output of the array storage 104. The digital FFT processor 110 transforms the time history contained in the I and Q signals from the left/center aperture on the lines 106 and 108 to a frequency domain representation of the received data $I_{1c}$ and $Q_{1c}$ on the lines 114 and 116. In a similar fashion, an FFT processor 130 is connected by the lines 126 and 128 to the output of the array storage 124. The digital FFT processor 130 transforms the frequency domain signals from the center/right aperture at its input on the lines 126 and 128 to frequency domain signals $I_{cr}$ and $Q_{cr}$ on the lines 134 and 136. In other words, each FFT processor converts the $N_d$ samples of the time history, of each of the returns in $N_r$ range bins into corresponding $N_d$ samples of frequency domain information. At the output of each FFT processor we have the frequency characteristics for each range bin, this being referred to as a range doppler map of a size $N_r$ range bins by $N_d$ doppler filters. This information is then presented to a detection and validation processor 250.

A bulk memory unit 200 and a bulk memory unit 202 are provided. The $I_c$ signal 114 and the $Q_c$ signal 116 are fed into and stored in the bulk memory unit 200 while the $I_{cr}$ signal 134 and the $Q_{cr}$ signal 136 are fed into and stored in the bulk memory unit 202. These memory units are sized so that they contain $2N_b$ bits of information for $N_r$ range bins by $N_d$ doppler filters. At this point we are ready to perform our detection of moving targets which possess enhanced signal to clutter characteristics. Magnitude detectors 210 and 214 are connected to the output of the bulk memory units 200 and 202, respectively, and perform a conventional magnitude detection routine on the information stored in the bulk memory. This is of a conventional type in which a well-known technique involves taking the larger of the two quadrature components and adding to it one-half of the smaller component. For all purposes, this is a sufficiently accurate representation of true magnitude. The outputs of the magnitude detectors are signal lines 212 and 216 which go to a map addition unit 218. This units adds mangitudes for each of $N_r$ range cells by $N_d$ doppler filters from its two input lines for further signal enhancement. The resultant range doppler map on signal line 220 goes to a CFAR type thresholding circuit 222. Average signal levels are computed in the range and/or doppler dimension and potential targets are declared if they exceed the local averages by a known threshold factor. The outputs 226 are then stored temporarily while target angle processing is completed. The outputs of the bulk memory units 200 and 202 which represent the signals $I_{1c}$, $Q_{1c}$, $I_{cr}$ and $Q_{cr}$ are presented to an angle calculation unit 234. This consists of a complex multiplier unit of conventional design and would typically contain four multipliers and two summing devices in which the inputs are complex multiplied to obtain complex signals from which the angle to the target can be derived. Also included in the angle calculation unit 234 is an arc tangent ROM which takes the in-phase and quadrature information and derives an electrical phase angle. The electrical phase angle is then scaled by the interferometer scale factor to give the true angular field position for all signals in the total map of $N_r$ range bins by $N_d$ doppler filters and appears on signal line 236.

Figure 3:
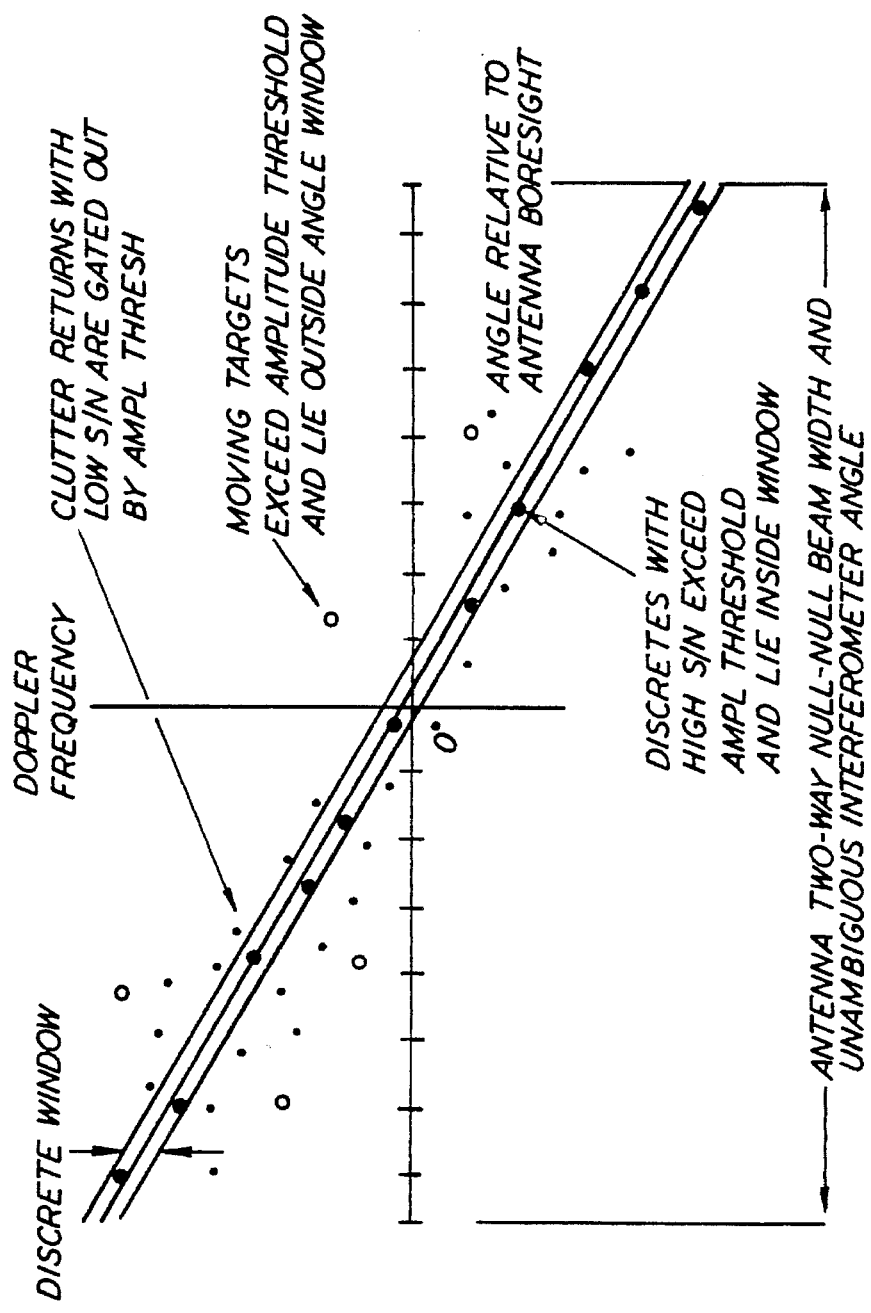
FIG. 3 describes the target validation procedure which combines the amplitude validation process and the angle validation process.

According to a particular feature of the present invention, an angle discrimination unit 238 is provided and is connected to the angle calculation unit 234 and the target validation unit 228. The angle discrimination unit receives doppler and angle information from the angle calculation unit 234 and evaluates the angular information of all signals against the known angle doppler interferometric relationship. A discrete window is provided about the known linear relationship and signals falling within the discrete window will be identified as fixed targets. Candidate signals falling within the discrete window will be identified as fixed targets and rejected. Candidate signals falling outside the discrete window will be identified as potential moving targets and will pass to the target validation unit 228 on signal line 240. The target validation unit correlates potential moving targets which have passed an amplitude threshold on signal line 226 with potential moving targets which have passed an angle discrimination test on signal line 240. There is seen in FIG. 3 a discrete window within which potential targets are rejected as moving by the angle discriminant 238. In addition it also depicts the amplitude thresholding of CFAR threshold 222. These two discriminants are combined in the target validation unit 228 to identify those potential targets which pass both the angle and amplitude tests and to declare true moving targets. The output of the target validation unit is the range, $r_t$, and doppler, $f_t$, locations of the true moving targets which have passed both amplitude and angle conditions on signal lines 230 and 232. Available on signal line 224 is amplitude information, $a_t$, for those moving targets and available on signal line 236 is the angular location, $\theta_t$, of these moving targets with respect to antenna boresite.

Although this invention has been shown and described with respect to a preferred embodiment, it will be understood by those skilled in this art that various changes in form and detail thereof may be made without departing from the spirit and scope of the claimed invention.

We claim:

1. An AMTI radar system for a moving platform comprising:

antenna means having three receive apertures—a left aperture, a center aperture, and a right aperture—each for receiving radar return signals;

first receiver means, associated with a first channel, for converting received radar return signals to in-phase and quadrature components;

second receiver means associated with a second channel for converting received radar return signals to in-phase and quadrature components;

pulse repetition frequency means for providing timing signals at pulse repetition intervals, PRI's, switching means, responsive to the timing signals, for connecting the left aperture to the first receiver means and the center aperture to the second receiver means during odd PRI's so that in-phase and quadrature signals related to the left aperture are provided in the first channel and in-phase and quadrature signals related to the center aperture are provided in the second channel during said odd PRI's; and for connecting the center aperture to the first receiver means and the right aperture to the second receiver means during even PRI's so that in-phase and quadrature signals related to the center aperture are provided in the first channel and in-phase and quadrature signals related to the right aperture are provided in the second channel during said even PRI's;

motion compensation means connected in each channel to the outputs of the receiver means and responsive to platform motion for providing in each channel motion compensated in-phase and quadrature signals;

first signal processing means, connected in the first channel, for providing left-minus-center information based on the in-phase and quadrature signals related to the left aperture during odd PRI's and the in-phase and quadrature signals related to the center aperture during even PRI's;

second signal processing means, connected in the second channel, for providing center-minus-right information based on the in-phase and quadrature signal's related to the center aperture during odd PRI's and the in-phase and quadrature signals related to the right aperture during even PRI's;

array storage means connected in each channel for storing said left-minus-center information and said center-minus-right information in separate range doppler maps; and third signal processing means connected to said array storage means for providing range, doppler, angle, and amplitude information in response to the range doppler maps.

2. Apparatus according to claim 1, characterized in that the moving platform is an aircraft and the pulse repetition frequency is related to aircraft motion.

3. Apparatus according to claim 1, characterized in that all three apertures are used for the radar illuminating aperture.

4. Apparatus according to claim 1, characterized in that the first signal processing means comprises:

first delay means, responsive to the motion compensated in-phase and quadrature signals of the first channel and to the timing signals, for providing motion compensated in-phase and quadrature signals that are delayed by one PRI;

first adder means, responsive to the motion compensated in-phase and quadrature signals and to the delayed motion compensated in-phase and quadrature signals, for providing difference signals in response to the motion compensated in-phase and quadrature signals of successive PRI's; and first gate means, responsive to the difference signals and to the timing signals, for providing the left-minus-center information in the first channel;

and the second signal processing means comprises:

second delay means, responsive to the motion compensated in-phase and quadrature signals of the second channel and to the timing signals, for providing motion compensated in-phase and quadrature signals that are delayed by one PRI;

second adder means, responsive to the motion compensated in-phase and quadrature signals and to the delayed motion compensated in-phase and quadrature signals, for providing difference signals in response to the motion compensated in-phase and quadrature signals of successive PRI's; and second gate means, responsive to the difference signals and to the timing signals, for providing the center-minus-right information in the second channel.

* * * * *